Oct. 27, 1959  D. GRANT ET AL  2,909,927
FLUID PRESSURE GAUGE
Filed Jan. 23, 1956
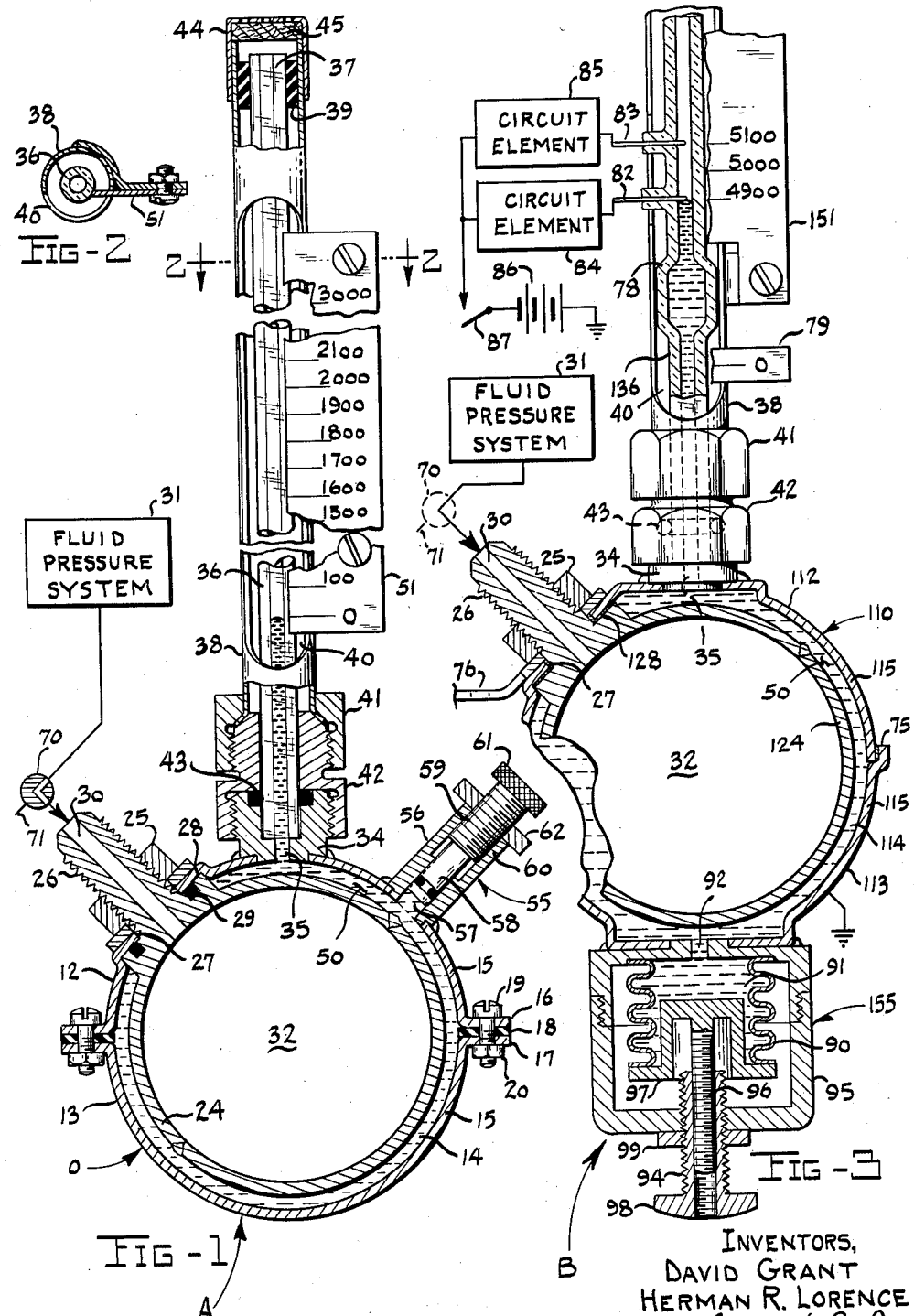
INVENTORS,
DAVID GRANT
HERMAN R. LORENCE
BY Leslie K. Locher
THEIR AGENT.

United States Patent Office 2,909,927
Patented Oct. 27, 1959

2,909,927

FLUID PRESSURE GAUGE

David Grant, Los Angeles, and Herman R. Lorence, Palos Verdes Estates, Calif., assignors to Hughes Tool Company, Aircraft Division, Houston, Tex., a corporation of Delaware Application January 23, 1956, Serial No. 560,611

4 Claims. (Cl. 73—388)

This invention relates to gauges particularly adapted for measuring fluid pressures of extremely high orders, and has for its primary purpose the provision of such a gauge which is not only direct reading, but which also maintains a high degree of permanent accuracy over its calibrated range.

In conventional direct-reading fluid-pressure gauges, it is common practice to employ pressure sensing elements, such as diaphragms, bellows, or Bourbon tubes, connected by mechanical linkages to pointers associated with graduated dials. Because of their configuration, sensing elements of the above character are subjected to unequal stresses from the pressures being measured; thus when extremely high pressures are involved, these sensing elements deviate from their normal proportional movement causing the accuracy of the gauges to be impaired. Therefore, where precision is important, these gauges must be checked against some standard, such as a dead-weight fluid-pressure measuring device, at frequent intervals to insure accuracy of the sought results. This condition applies not only to the production testing and inspection of pressure-operated devices, but it also applies to methods and processes employing fluid pressures in which the valves of the pressures must be maintained within close limits, sometimes at elevated temperatures.

Accordingly, it is an object of the present invention to provide a fluid-pressure gauge characterized by relatively permanent accuracy to avoid the need for checking against a standard, and which, because of this characteristic, constitutes a uniform standard gauge of itself.

It is another object to provide such a fluid-pressure measuring gauge in which the pressure sensing element is constructed to avoid unequal stresses resulting from fluid-pressure measurements.

It is a further object to provide such a gauge in which the pressure sensing element is adapted to expand uniformly in substantially all directions in response to fluid pressures being measured, and in which the expansion of this element effects visible direct-reading indications without mechanical linkage.

It is another object to provide such a gauge in which the pressure sensing element is a hollow spherical device of which the spherical volume is caused to vary in response and proportion to the fluid pressure being measured when such pressure is admitted to the element hollow, and in which the direct reading indications are effected by a quantity of liquid surrounding the pressure sensing element and confined to measurable movement in the bore of a vertically supported tube, in response and proportion to variations in the volume of the pressure sensitive element.

It is another object to provide such a gauge wherein the tube is provided with a bore having different diametered portions such that the proportional relationships between the volume variations of the pressure sensing element and the height variations of the column of liquid are different for the different portions of the tube.

It is an additional object to provide such a fluid-pressure gauge which includes compensating means operable to not only provide an accurate indication of zero pressure, but to also avoid inaccurate readings resulting from ambient temperature changes and to provide accurate indications of fluid pressures at elevated temperatures without calculations involving correction factors or deviation coefficients.

It is also an object to provide such a gauge which includes means for closing and opening an electrical circuit when a predetermined fluid-pressure is attained without employing mechanical linkage.

These and other objects and advantages will become more apparent from the following description considered in connection with the accompanying drawings which illustrate the novel features of this invention for descriptive purposes only and which are not intended as a definition of the limits thereof.

Fig. 1 is a sectional view of a fluid-pressure gauge constructed according to this invention;

Fig. 2 is a sectional view taken on line 2—2 of Fig. 1; and

Fig. 3 is a sectional view of a modification of the gauge illustrated in Fig. 1.

Reference letter A in Fig. 1 indicates a pressure gauge comprising a housing or body member 10 constructed of hemispherical shells 12 and 13 which are assembled such that the walls of the shells combine to form a fluid-tight generally spherical chamber 14 having a perimetric wall 15. Shells 12 and 13 are provided with radial flanges 16 and 17 separably connected with an interposed gasket 18 by suitable means such as screws 19 and nuts 20.

A hollow, substantially spherical, pressure-sensitive element 24, constructed of material having elastic properties according to Hooke's law with an elastic limit suitable for the sought results, is rigidly supported within chamber 14 in spaced relationship with respect to the inner surface of perimetric wall 15 by means of a nut 25 in threaded engagement with a nipple 26 which extends outwardly from sphere 24 and through an opening 27 in the wall of hemispherical shell 12. Nipple 26 includes a shoulder 28 adjacent sphere 24, which is adapted to hold an O-ring 29 for effecting a fluid-tight seal between the nipple and perimetric wall 15 when nut 25 is securely tightened. A passageway 30 through nipple 26 provides means for conducting fluid-pressure from a fluid-pressure system 31 into the cavity or hollow 32 of pressure sensitive sphere 24.

A threaded boss 34, attached to hemispherical shell 12 of body member 10 by brazing or other suitable means, is adapted to support a transparent sight tube 36 in an upright position and such that one end of the bore of the sight tube communicates with chamber 14 via a passageway 35 through boss 34. The support of tube 36 is further effected by a metal tube 38 concentrically surrounding the sight tube throughout its length to afford protection for this tube and to hold the distal end 37 thereof with a bushing 39 preferably made of rubber or other nonmetallic material. It is to be noted that tube 38, provided with an elongated sight opening 40 in the tube wall to permit visual observation of sight tube 36, is rigidly attached to boss 34 by a nut 41 and a connector element 42 which cooperates with an O-ring 43 to effect a fluid-tight seal between boss 34 and the sight tube. Tube 38 is also provided with a perforated cap 44 and a filter 45, at its distal end, to admit air to but exclude dust particles from the open distal end 37 of sight tube 36.

As illustrated, the space between the outer surface of hollow sphere 24 and the inner surface of wall 15 of body member 10, which comprises that portion of chamber 14 not occupied by the pressure sensitive element, is filled with a suitable liquid such as mercury identified by reference numeral 50. The filling procedure involves the operation of flowing the liquid mercury into chamber 14 through the open distal end 37 of sight tube 36 until the level of the mercury in this tube reaches the zero line, at the lower end of sight opening 40, on a scale 51 attached to support tube 38 as shown in Fig. 2.

When fluid pressure from system 31 enters the cavity of sphere 24 through passageway 30, such pressure applies tensional forces to the wall of the sphere, and, since this wall is constructed of material having elastic properties according to Hooke's law, the ability of the wall to resist expansion varies inversely with the tensional forces applied; hence, an increase in fluid pressure within the cavity of the sphere effects an increase in its spherical volume, thereby causing it to occupy more space in chamber 14 which, in turn forces mercury from the chamber and up the bore of sight tube 36; hence the column of mercury in the sight tube will rise above the zero mark of scale 51 a distance representative of the increase in the size of the sphere, and will return to the zero mark as the sphere decreases to its normal size in response to a decrease to zero, that is, to a pressure value of the ambient atmosphere of the fluid pressure entering the cavity. Because of the proportional elastic properties of the wall material in sphere 24, there is a direct relationship between the increased size of the sphere and the unit pressure of the fluid from system 31; thus, there is a direct relationship between the distance above the zero mark attained by the rising column of mercury and the unit pressure of the fluid pressure system. This relationship is permanently established through a process of calibration: for example, let it be assumed that fluid pressure system 31 is a dead-weight system of conventional design providing fluid pressure of known values. Accordingly, when a known pressure of 100 pounds per square inch is attained, the column of mercury in sight tube 36 rises to a certain level above the zero mark. After the level is established, its height is identified by a line and the number 100 inscribed on scale 51. Similarly, other pressures are established and identified throughout the length of the scale to provide a full and accurate calibration of the gauge.

Generally speaking, the accuracy of fluid-pressure gauges is effected by operating temperatures; hence an important feature of this invention resides in the provision of a temperature compensator 55 which, in effect, becomes a variable portion of chamber 14, whereby the zero level of the mercury in sight tube 36 may be raised or lowered to coincide with the zero mark on scale 51 if the zero level should deviate for any reason such as thermal expansion or contraction of gauge A components.

Compensator 55 comprises a cylinder 56 attached to body member 10 such that the bore 57 of the cylinder communicates with chamber 14. A piston 58, fitting bore 57 in fluid-tight relationship, is provided with an externally threaded portion 59 adjustably engaging an internally threaded portion 60 of the cylinder 56 for effecting selective axial movement of the piston within the bore in response to rotation of the piston by rotary forces selectively applied to a knob 61 on the external end of piston 58. Thus bore 57 and piston 58 cooperate to form a variable space which, as stated above, becomes, in effect, a variable portion of chamber 14 that is filled with mercury during the filling operation previously described. If the height of the column of mercury deviates from the mark indicating zero pressure in pressure sensitive element 24, then a locknut 62 associated with the threaded portions of the piston and cylinder is manipulated and piston 48 is moved axially within bore 57 such as to cause the level of the mercury column to coincide with the zero mark.

Another important feature of the present invention resides in the fact that gauge A can be used for measuring fluid pressures at elevated temperatures. For example, let it be assumed that system 31 is developing pressures above 1000 p.s.i. at a temperature of 300° F., and a measurement of the exact pressure at that temperature is desired. Such a measurement is obtained by admitting the pressure from the system into the gauge through a two-way valve 70 connected to nipple 26; thus, gauge A, heated by fluid from system 31, soon attains a maximum operating temperature, and when this maximum temperature is reached valve 70 is turned in a clockwise direction so that passageway 30 is connected to atmosphere through suitable means, such as a conduit 71, causing pressure in the hollow pressure sensitive element 24 to be reduced to the value of the atmospheric pressure. With atmospheric pressure in the pressure sensing element, any deviation of the column of mercury from the zero mark on scale 51 can now be corrected with compensator 55 in the manner above described. After correction of the mercury-column level, valve 70 is turned counterclockwise to the position shown, whereupon the pressure indicated by the column of mercury in sight tube 36 as measured by the graduations on scale 51 will be an accurate reading of the pressure in system 31 at the elevated temperature. Because of compensator 55, accurate pressure measurements are obtained directly by visual observation, and without the mathematical calculations involving correction factors or deviation coefficients common to other gauges in the prior art. Hence, unskilled operators can provide highly accurate information with gauge A.

When pressures at temperatures above normal atmospheric and/or room temperatures, for instance above 300° F., are to be considered within the range of a gauge constructed according to this invention, the material selected for making pressure sensitive element 24 must be capable of maintaining a high percentage of its elastic properties at the elevated temperatures involved. For information regarding such materials, reference is made to Hoyt's Metal Data Book, published by Reinhold Publishing Corporation, and to a book published by McGraw-Hill Book Company, titled "Engineering With Rubber."

The pressure gauge illustrated in Fig. 3, identified by reference letter B is a modification of gauge A shown in Fig. 1. In gauge B upper and lower hemispherical shells 112 and 113 of body member 110 are joined by a brazed or soldered circumferential joint 75 such that the walls of the shells combine to form a fluid tight chamber 114 having a perimetric wall 115. Pressure sensitive element 124 is similar in every respect to element 24 of gauge A except that the fluid-tight seal between nipple 26 and opening 27 in the wall of shell 112 is effected by brazing or soldering shoulder 128 to the inner side of the shell wall, as illustrated, and nut 25 is employed for attaching a mounting bracket 76 to body member 110, as shown in the drawing.

A sight tube 136 similar in character to sight tube 36 of gauge A, is supportingly connected to body member 110 by threaded boss 34, connector element 42, and O-ring 43 such that one end of the bore of sight tube 136 communicates with chamber 114, and is additionally supported and protected by tube 38, with its sight opening 40, in the same manner previously described for sight tube 36 in Fig. 1.

According to the view in Fig. 3, gauge B is intended for use in measuring fluid pressures above 4900 p.s.i., as evidenced by the calibrations inscribed on a scale 151 suitably attached to tube 38, which calibrations have been established in the same way as the calibrations on the scale of gauge A. The difference between sight tubes 36 and 136 resides in the provision of a larger diametered portion 78 of the bore of tube 136 above a zero marker 79 fixed to tube 38 at the lower end of sight opening 40, which enlarged portion having a capacity equal to that of any desired length of the tube, operates to receive mercury forced from chamber 114 by expansion of element 124 in response to fluid pressures above the zero mark and below the lowest graduation on scale 151. Thus, by constructing sight tubes in this manner, awkward lengths of these tubes can be avoided, and gauges having optimum accuracy and sensitivity can be provided for measuring extremely high pressures.

In addition to the above difference, tube 136 is provided with electrodes 82 and 83 positioned in the wall of the tube approximately opposite the 4900 and 5100 p.s.i. levels, respectively, whereby the electrical conductivity of the column of mercury in tube 136 can be employed to close electrical circuits embracing circuit elements 84 and 85, energized by potential from a source such as battery 86. In other words, when a switch 87 is closed, fluid pressure from system 31 becomes effective for causing the column of mercury in tube 136 to successively contact electrodes 82 and 83, whereupon circuit elements 84 and 85 are actuated to provide visible and/or audible signals, or to perform other useful functions.

Gauge B is also provided with a compensator 155 having the same function as compensator 55 in gauge A, which comprises a bellows 90 characterized by a variable cavity 91 communicating with chamber 114 by means of a fluid-conducting passageway 92 through the bottom wall of lower hemispherical shell 113. Because of passageway 92, variable cavity 91 becomes, in effect, a variable portion of chamber 114, which is filled with mercury during the filling of chamber 114 by an operation similar to that previously described for gauge A. Variation of cavity 91 is accomplished by a differential screw mechanism comprising an adjusting screw 94 in threaded engagement with a bellows-protecting cover 95, and in threaded engagement with a stud portion 96 of a closure element 97 which forms a part of bellows 90. Axial movement of the bellows is effected by rotary forces selectively applied to a knob 98 on the exposed end of adjusting screw 94; thus, when knob 98 is turned the volume of cavity 91 is varied in proportion to the axial movement of bellows 90, and mercury is added to or removed from chamber 114 accordingly. Therefore, if the height of the column of mercury in sight tube 136 deviates from the zero marker 79, correction can be achieved by turning knob 98 in the direction required for the sought results. A locknut 99 is provided for maintaining adjusting screw 94 in its adjusted position.

When a requirement for accurate measurement of fluid pressures at elevated temperatures is present, valve 70 and conduit 71, previously described in connection with gauge A, may be employed as indicated schematically by dotted lines in the fluid-conducting passageway interconnecting system 31 and nipple 26 of Fig. 3.

Under certain conditions, it may be desirable that the column of liquid in sight tubes 36 and 136 operate in a vacuum; hence, after the gauges are filled to the zero level, substantially all air is removed from the remaining portions of the tubes and the distal ends of the tubes are then sealed in a suitable manner by any one of the well-known processes commonly employed for similar purposes.

From the foregoing description of gauges A and B, it becomes apparent that the fluid pressure being measured is contained within hollow pressure-sensitive elements 24 and 124, which, because of their ability to enlarge in proportion to the fluid pressure within their respective cavities, force liquid upwardly in sight tubes 36 and 136; hence, these gauges operate without direct contact between the fluid under pressure and the liquid in chambers 14 and 114, and the sight tubes. This unique feature avoids deterioration and/or contamination of the liquid in the gauge, and combines with temperature compensators 55 and 155 to provide the gauges of this invention with utility, efficiency, and long life not available in prior art gauges.

A further advantage found in the use of hollow spherical elements 24 and 124 over the use of other prior art pressure sensing devices such as hollow cylindrical elements, resides in the fact that it is much easier to provide spherical elements with walls of uniform thickness than it is to provide cylindrical elements with such walls. Moreover, within the proportional elastic limit of the material comprising the wall of a spherical element, the internal stress S equals $pd/4t$; whereas, with the same material in the wall of a cylindrical element, the internal stress equals $pd/2t$ (where $p$ is internal pressure, $d$ is internal diameter of the element, and $t$ is the element wall thickness). Thus, for equal values of S, $p$, and $d$, the wall thickness of a spherical element needs to be only one half the wall thickness of a cylindrical element. These differences between the ease of production and between the thickness of the walls result in substantial savings in the cost of manufacturing spherical pressure sensitive elements over the cost of making such elements in cylindrical form.

Another feature of this invention to which special attention is directed resides in the design flexibility afforded by enlarged portions in sight-tube bores of the character of portion 78 in sight tube 136. For instance, a gauge with a scale graduated from 0 to 500, 2000 to 2500, and 4500 to 5000 can be provided by interposing enlarged portions in the bore of the sight tube between the 500 and 2000 marks and between the 2000 and 4500 marks. It is also important that selections can be made from a wide choice of available materials for constructing hollow, spherical, pressure-sensing elements; thus, by selecting particular materials and proportioning the diameters and the wall thicknesses of the hollow spherical elements in keeping with the proportional elastic limits of the materials selected, and by providing sight tubes with suitable bores, extremely sensitive and accurate gauges can be constructed for fluid pressure measurements over a wide range of conditions.

What is claimed as new is:

1. A device for measuring fluid pressure in a fluid-pressure system, said device comprising: a hollow pressure-sensitive element having a spherical wall of elastic material, characterized by expansion resisting ability inversely proportional to fluid pressure within the hollow of the element such that variations in the pressure magnitude of said fluid pressure effects directly proportional spherical variations in the spherical volume of said hollow element; a housing having a generally spherical chamber enclosing the hollow pressure-sensitive element, said housing comprising a pair of hemispherical shells joined in fluid-tight relationship such as to form the wall of said chamber; means connecting a portion of the spherical wall of the hollow element to a portion of the chamber wall of the housing, said means effecting rigid support of the hollow element within the housing chamber such as to form a liquid-holding space completely surrounding said element except for that portion of the element wall involved in the supporting action, said support means including a passageway for conducting fluid pressure from the fluid-pressure system through the wall of the housing chamber into the hollow of said element; and means responsive to variations in the spherical volume of the hollow pressure-sensitive element for indicating the pressure magnitude of the fluid pressure within the hollow of said element, effecting said volume variations, said pressure indicating means including a tube connected in upright position to one of the hemispherical shells such that one end of the base of the tube communicates with the liquid-holding space surrounding said hollow element, a quantity of liquid completely filling the liquid-holding space and a preselected portion of the base of said tube such that liquid in said tube base constitutes a column of liquid of preselected height proportional to the normal volume of the pressure-sensitive element and such that variations in the volume of said element causes proportional variations of the liquid column height in the bore of the tube, and a measuring scale mounted adjacent the tube to enable measurement of height variations of said liquid column in terms corresponding to the volume variations of the hollow pressure-sensitive element but expressing unit pressure magnitude of the fluid pressure within said hollow element effecting said volume variations.

2. The combination defined in claim 1 in which the means supporting the hollow pressure-sensitive element within the housing chamber comprises a rigid fluid-tight mechanical connection interconnecting said hollow element and one of the pair of hemispherical shells, said connection including a fluid-conducting conduit extending through an opening in the wall of said one shell.

3. The combination defined in claim 2 which is further characterized by means connected to one of the pair of hemispherical shells for effecting height adjustments of the column of liquid in the bore of said tube when said column deviates from the preselected height; said means including a cavity communicating with the liquid-holding space surrounding the hollow pressure-sensitive element, said cavity being completely filled with the liquid filling said space, and a mechanism capable of varying the capacity of said cavity such that quantities of said liquid may be added to or subtracted from the liquid-holding space in amounts required to correct column deviations.

4. The combination defined in claim 2 in which the tube of the pressure indicating means is characterized by a bore having portions with different diameters such that the proportional relationships between the volume variations of the hollow pressure-sensitive element in the housing chamber and the height variations of the column of liquid in the bore of the tube are different for said different portions of said bore.

References Cited in the file of this patent

UNITED STATES PATENTS

| | | |
|---|---|---|
| 785,438 | Sargent | Mar. 21, 1905 |
| 1,245,559 | Booth | Nov. 6, 1917 |
| 1,258,426 | Mackintosh | Mar. 5, 1918 |
| 1,265,676 | Klump | May 7, 1918 |
| 1,532,170 | Bouffort | Apr. 7, 1925 |
| 1,588,285 | Weaver | June 8, 1926 |
| 1,687,351 | Schoolfield | Oct. 9, 1928 |
| 1,815,000 | Durant | July 14, 1931 |

FOREIGN PATENTS

| | | |
|---|---|---|
| 103,758 | France | 1874 |
| 516,840 | France | Apr. 26, 1921 |
| 1,089,976 | France | Mar. 25, 1955 |

UNITED STATES PATENT OFFICE

CERTIFICATE OF CORRECTION

Patent No. 2,909,927                                          October 27, 1959

David Grant et al

It is hereby certified that error appears in the printed specification of the above numbered patent requiring correction and that the said Letters Patent should read as corrected below.

Column 1, line 23, for "Bourbon" read — Bourdon —; line 38, for "valves" read — values —.

Signed and sealed this 19th day of April 1960.

(SEAL)
Attest:

KARL H. AXLINE                                    ROBERT C. WATSON
Attesting Officer                                 Commissioner of Patents